Figure 1:
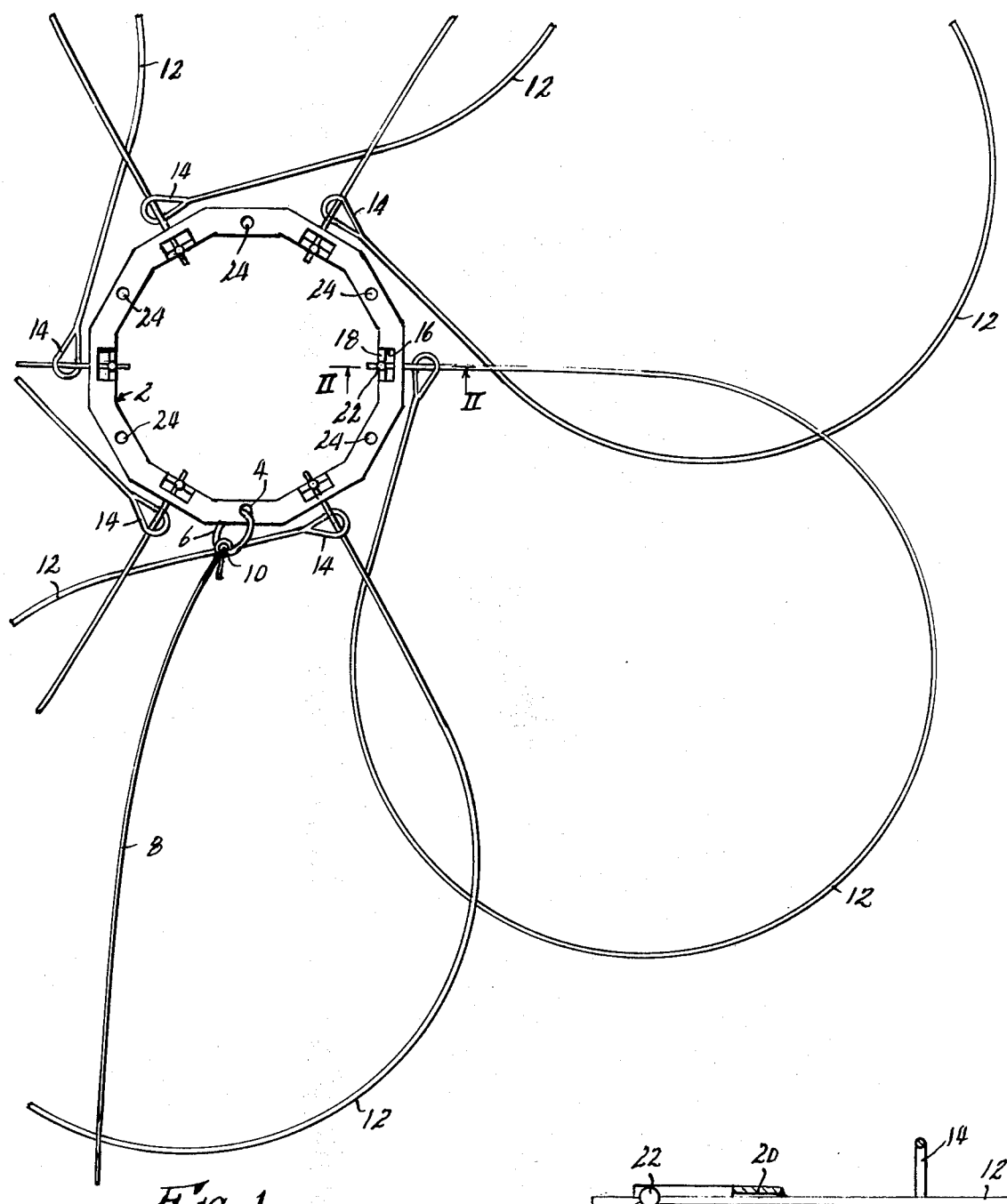

United States Patent [19]
Archer

[11] 4,271,625
[45] Jun. 9, 1981

[54] OCEAN CRAB TRAP

[76] Inventor: Farley J. Archer, 11621 Holmes Point Dr., Kirkland, Wash. 98033

[21] Appl. No.: 61,802

[22] Filed: Jul. 30, 1979

[51] Int. Cl.³ .............................................. A01M 23/34
[52] U.S. Cl. ............................................ 43/87; 43/100
[58] Field of Search ................ 43/87, 86, 42.7, 100, 43/105, 17.2

[56] References Cited

U.S. PATENT DOCUMENTS

| | | | |
|---|---|---|---|
| 2,656,642 | 10/1953 | Richa | 43/100 |
| 2,676,430 | 4/1954 | Richard | 43/17.2 |
| 2,793,466 | 5/1957 | Esposito | 43/87 |
| 3,815,276 | 6/1974 | Harrison | 43/42.7 |
| 4,216,607 | 8/1980 | Lyster | 43/87 |

FOREIGN PATENT DOCUMENTS

121221 12/1918 United Kingdom .................. 43/87

*Primary Examiner*—Gary L. Smith
*Assistant Examiner*—Robert P. Olszewski
*Attorney, Agent, or Firm*—John A. Hamilton

[57] ABSTRACT

An ocean crab trap consisting of a non-buoyant ring adapted to be secured to the end of a fishing line for casting or dropping to lie on the ocean floor, and adapted to have suitable bait secured therein, and a plurality of resilient snare nooses secured to the ring in spaced relation around its periphery and projecting outwardly therefrom, in order that a crab feeding on the bait must be standing in at least one of the nooses so as to be snared thereby when the fishing line is pulled in.

1 Claim, 2 Drawing Figures

U.S. Patent    Jun. 9, 1981    4,271,625

OCEAN CRAB TRAP

This invention relates to new and useful improvements in crab traps, and has particular reference to crab traps of the snare or noose type.

An object of the present invention is the provision of a crab trap consisting of a body member adapted to be secured to the end of a fishing line and to have bait secured thereto, and a series of running nooses attached to said body member. The body member is sufficiently heavy and non-buoyant to sink in salt water and hold the bait down on the ocean floor. Thus crabs feeding on the bait will be ensnared in the nooses.

Another object is the provision of a crab trap of the character described wherein the body member comprises a hollow ring in which the bait may be secured, and wherein said nooses are distributed circumferentially of said ring externally thereof, whereby crabs feeding on the bait will be standing within one or more of the nooses to be more readily snared thereby.

A further object is the provision of a crab trap of the character described wherein the running nooses are formed of strands of resilient material, whereby the loops formed thereby tend to remain open until crabs are positioned therein and a pull is exerted thereon by the fishing line, whereupon they will close to snare the crabs.

Still further objects are the provision of means whereby the nooses, though of course necessarily quite flexible, are caused to remain evenly spaced about the body member ring, and to lie substantially flat on the ocean floor.

Other objects are simplicity and economy of construction, and efficiency and dependability of operation.

Figure 2:
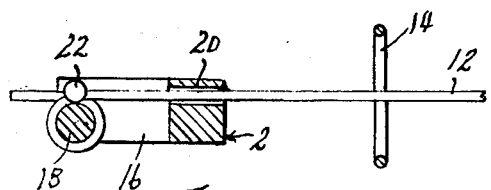

With these objects in view, as well as other objects which will appear in the course of the specification, reference will be had to the accompanying drawing, wherein:

FIG. 1 is a fragmentary top plan view of an ocean crab trap embodying the present invention, and FIG. 2 is an enlarged, fragmentary sectional view taken on line II—II of FIG. 1.

Like reference numerals apply to similar parts throughout the drawing, and the numeral 2 applies generally to the body member of the carb trap, said body member comprising a flat ring formed of steel, lead or other heavy, non-buoyant material. Said ring is shown in the form of a twelve-side polygon, although its specific configuration is not pertinent to the concept of the invention. At one side, said ring has a hole 4 formed therethrough transversely of its plane, in which is secured a small ring 6 in which a fishing line 8 may be knotted as indicated at 10. Said line may be a hand line, or the line of a casting rod, so that the body member may be dropped or cast to the ocean floor at any desired crab fishing location.

As shown, body member ring 2 carries six running snare nooses 12 extending outwardly therefrom at regularly spaced angular intervals. Each noose is formed of a single strand of flexibly resilient material such as a fine steel wire, a monofilament plastic wire, or other suitable material. The strand of each noose is secured at one end in ring 2 by means to be described, and is provided at its opposite end with an open eye 14 engaged loosely about the standing portion thereof, whereby to form an open noose. The resilience of each strand tends to hold the noose formed thereby in an open position, as shown in FIG. 1 with the eye 14 thereof closely adjacent or against ring 2. The length of the strands, and the diameters of the nooses formed thereby, are preferably such that the nooses overlap each other angularly of the ring, as shown. FIG. 1 shows only one of the nooses in its entirety, but it will be understood that all are identical.

As will appear, it is desirable that the nooses normally remain in uniform angular spacing around the ring, and that they normally lie generally flat against the ocean floor. For these purposes, one end of the strand forming each noose is secured to ring 2 by a special connection best shown in FIG. 2. At the position of attachment of each noose strand to the ring, a notch 16 is formed in the inner periphery of the ring, and a cross bar 18, integral with the ring, tranverses said notch generally tangentially of the ring. A small hole 20 is formed through the ring at the base of the notch, said hole being radial to the ring, and intermediate the top and bottom surfaces thereof. To attach a strand, it is inserted inwardly through hole 20, then tied or otherwise secured around across bar 18, as indicated at 22. The enclosure of the strand within hole 20, in which it is engaged snugly but slidably, insures that the strand will extend from the ring in an initially radial relation thereto, without pivoting or swinging relative thereto, and without movement along the circumference of the ring. Therefore the nooses tend to remain uniformly angularly space about the ring. Also, if the nooses formed by the strands are laid flat on a surface coplanar with ring 2 at the time said strands are tied or otherwise secured to cross bars 18, said nooses will thereafter tend to remain flat and coplanar with the ring, since the connection to the cross bars prevents the strands from turning about their axes.

In the use of the trap, bait of any suitable type is secured within ring 2. Such bait could, for example, consist of fish heads or entrails, or parts of carcasses of any type of marine life. Ring 2 is provided with holes 24 intermediate the noose connections to receive strings or the like to facilitate the mounting of bait in this manner. The device is then dropped or cast into the water, tethered by fishing line 8, over a crab fishing bed. Ring 2 is of sufficient weight to sink in salt water, and to hold the bait down on the ocean floor. The device will tend to come to rest on the ocean floor in the position shown in FIG. 1, with ring 2 lying flat, and with nooses 12 open due to the resilience of the strands of which they are formed, uniformly angularly spaced about the ring due to the initially radial projection of their strands as provided by holes 20 of the ring, and lying flat on the ocean floor due to the "non-twisting" connection of the strands to cross bars 18. The nooses then define and enclose a generally annular trapping area around ring 2, this area being angularly continuous if the nooses overlap as shown. Thus any crab approaching to feed on the bait within the ring will almost certainly be standing within one or more of the nooses, so that when the fisherman feels any slight tug or jerk on line 8 and pulls the line in, the nooses in which the crab is standing will close about some part of the crab. With six nooses as shown, and since each crab has eight legs and two pincers, the crab has very little chance of escaping. If the bait tied firmly in place so as to resist separation from the ring, so that attempts of a crab to dislodge it will cause sharp movements of the ring, and if the fisherman maintains a slight tension on line 8, in order to be able to detect movements of the ring, the fisherman will experience no difficulty in knowing when the pull in the line.

While I have shown and described a specific embodiment of my invention, it will be readily apparent that many minor changes of structure and operation could be made without departing from the spirit of the invention.

What I claim as new and desire to protect by Letters Patent is:

1. An ocean crab trap comprising:
   a. a heavy, non-bouyant body member constituting a flat, open ring having means facilitating the securing of bait therein, and means for securing it to a fishing line for deposit in the water, whereby to sink and hold said bait against the ocean floor, and
   b. a series of free-running nooses attached to said ring at uniformly spaced angular intervals thereabout and projecting generally radially outwardly from said ring, each of said nooses being formed of a strand of flexibly resilient material having an eye formed at one end thereof, said eye being engaged for free running movement about a standing portion of said strand, whereby due to the resilience of the strand the noose normally tends to remain wide open, the opposite end of said strand being secured to said ring, said ring being provided, at the position of each said noose strands, with a radial hole in the plane of said ring, and a cross bar spaced inwardly from said hole, the associated noose strand extending inwardly in closely fitting sliding relation through said hole, whereby said strand is held securely in radially extending relation to said ring, and being secured about said cross bar, whereby to prevent turning of said strand end about its axis.

* * * * *